US007648935B2

United States Patent
Shimada et al.

(10) Patent No.: US 7,648,935 B2
(45) Date of Patent: Jan. 19, 2010

(54) DIELECTRIC PORCELAIN COMPOSITION FOR USE IN ELECTRONIC DEVICES

(75) Inventors: Takeshi Shimada, Osaka (JP); Kazuhiro Kura, Osaka (JP)

(73) Assignee: Hitachi Metals, Ltd., Tokyo (JP)

( * ) Notice: Subject to any disclaimer, the term of this patent is extended or adjusted under 35 U.S.C. 154(b) by 243 days.

(21) Appl. No.: 11/993,700

(22) PCT Filed: Jun. 24, 2005

(86) PCT No.: PCT/JP2005/011651
§ 371 (c)(1),
(2), (4) Date: Dec. 21, 2007

(87) PCT Pub. No.: WO2006/137153
PCT Pub. Date: Dec. 28, 2006

(65) Prior Publication Data
US 2008/0227622 A1    Sep. 18, 2008

(51) Int. Cl.
C04B 35/47    (2006.01)
(52) U.S. Cl. .................................... 501/136
(58) Field of Classification Search .................. 501/136
See application file for complete search history.

(56) References Cited

U.S. PATENT DOCUMENTS 5,356,844 A * 10/1994 Hirahara et al. ............. 501/136
6,503,861 B1    1/2003 Murakawa et al.
6,734,126 B2 * 5/2004 Ohtsuki et al. .............. 501/136
7,326,667 B2 * 2/2008 Iddles et al. ................ 501/136

FOREIGN PATENT DOCUMENTS

| JP | 2625074 | 4/1997 |
|---|---|---|
| JP | 11-106255 | 4/1999 |
| JP | 11-130528 | 5/1999 |
| JP | 11-278927 | 10/1999 |
| JP | 2004-91266 | 3/2004 |

(Continued)

OTHER PUBLICATIONS

International Search Report issued in PCT/JP2005/011651 on Sep. 20, 2005.
English Abstract for RU 2242442 (Dec. 20, 2004).

(Continued)

*Primary Examiner*—Karl E Group
(74) *Attorney, Agent, or Firm*—Stein McEwen, LLP

(57) ABSTRACT

The invention intends to provide a dielectric porcelain composition for use in electronic devices, which has the dielectric characteristics such that the Qf value is high, the temperature coefficient τf of a resonant frequency is small and a value thereof can be controlled in a wide range in positive and negative directions in the vicinity where the relative dielectric constant ∈r is 39. According to the invention, when, in La—Pr—Al—Ga—Sr—Ti-based oxide dielectric porcelain, contents of the respective elements are limited to be within particular ranges and Sr is partially substituted by Ca, a structure having a $(1-x)(La_{1-y}Ln_y)(Al_{1-z}Ga_z)O_3\text{-}x(Sr_{1-m}Ca_m)TiO_3$ solid solution as a main phase, in which a solid solution of Al—Ga—Sr-based oxide and/or a solid solution of Al—Ga-based oxide and a Sr oxide is/are precipitated in a grain boundary thereof, can be obtained, whereby the above-mentioned object can be achieved.

2 Claims, 7 Drawing Sheets

FOREIGN PATENT DOCUMENTS

| | | |
|---|---|---|
| JP | 2005-514298 | 5/2005 |
| JP | 2005-194114 | 7/2005 |
| RU | 2 242 442 C1 | 12/2004 |
| WO | WO 02/36519 A1 | 5/2002 |

OTHER PUBLICATIONS

Moon et al., "Microwave Dielectric Properties of the $(1-x)La_{2/3}TiO_3-xLaAlO_3$ System," Japanese Journal of Applied Physics, vol. 36 (1997), pp. 6814-6817.

* cited by examiner

DIELECTRIC PORCELAIN COMPOSITION FOR USE IN ELECTRONIC DEVICES

CROSS-REFERENCE TO RELATED APPLICATIONS

This application claims the benefit of PCT International Patent Application No. PCT/JP2005/011651, filed Jun. 24, 2005, and is related to Japanese Patent Application No. 2003-435694, filed Dec. 26, 2003, in the Japanese Patent Office, the disclosures of which are incorporated herein by reference.

TECHNICAL FIELD

The invention relates to a dielectric porcelain composition having characteristics most preferable for microwave/miliwave electronic devices that are used in dielectric resonators, dielectric filters, phase converters and the like, that is, a novel dielectric porcelain composition for use in electronic devices, in which, in a grain boundary thereof, a solid solution of Al—Ga—Sr-based oxide and/or a solid solution of an Al—Ga-based oxide and a Sr oxide is/are present.

BACKGROUND ART

A dielectric porcelain composition has been widely used in electronic devices operating in a high frequency region such as microwave and miliwave. As the characteristics required for the applications, the followings can be cited. That is, (1) since a wavelength is shortened to $1/\in r^{1/2}$ in a dielectric material, the relative dielectric constant ∈r is large to achieve miniaturization, (2) the dielectric loss in a high frequency region is small, that is, the Qf value is high, and (3) the temperature coefficient τf of a resonant frequency is small and stable.

Furthermore, it is important as well that the temperature coefficient τf is controllable in a predetermined range.

So far, as such a dielectric porcelain composition for use in high frequency, for instance, a La—Ti—Al—O-based one (see non-patent literature 1) has been known. However, the characteristics thereof are: ∈r=36, Qf value=45,000 GHz and τf=−2 ppm/° C., that is the Qf value is low.

Furthermore, in a Ba($Zn_{1/3}Nb_{2/3}$)$O_3$-based one (see non-patent literature 2), the characteristics such as ∈r=41, Qf value=86,000 GHz and τf=+31 ppm/° C. are obtained. However, a dielectric porcelain composition having small τf has not been obtained yet.

Recently, as a material that has a high dielectric constant and a high Qf value, La—Al—Ca—Ti-based-oxide dielectric porcelain (see patent literature 1) and La—Al—Sr—Ti-based-oxide dielectric porcelain (see patent literature 2) have been proposed. These materials have excellent characteristics such as the relative dielectric constant ∈r in the range of from 30 to 48 and the Qf value in the range of from 20,000 to 75,000 (values at 1 GHz). However, a dielectric porcelain composition having small τf has not been obtained yet.

Furthermore, in La—Al—Ca—Sr—Ba—Ti-based oxide dielectric porcelain, it has been proposed that α-$Al_2O_3$ is contained as a crystal phase to thereby increase the Qf value (see patent literature 3). Although this material has such excellent characteristics as 30,000 or more in the Qf value, the value of τf is relatively large in plus or minus.

In these materials, although the relative dielectric constant ∈r and the Qf value can be increased, characteristics of τf are not sufficient and there is no idea of controlling τf.

The applicant has previously proposed a dielectric porcelain composition for use in microwave, which has the dielectric characteristics such as ∈r=35 to 45, Qf value=50,000 Ghz or more and τf=0±10 ppm/° C. (see patent literature 4). In this composition, when, in La—Al—Sr—Ti-based oxide, a particular amount of Ga is added, the Qf value can be increased, and when a particular amount of Pr is further added, the τf value can be controlled to 0±10 ppm/° C.

Non-patent literature 1: Japanese Journal of Applied Physics, Vol. 36 (1997) 6814
Non-patent literature 2: *Erekutoroniku Seramikusu* (Electronic Ceramics), September (1993), pages 4-10
Patent literature 1: Japanese Patent No. 2,625,074
Patent literature 2: JP-A-11-130528
Patent literature 3: JP-A-11-106255
Patent literature 4: WO 02/36519 A1

DISCLOSURE OF THE INVENTION

Problem that the Invention is to Solve

According to the above-mentioned proposals made by the applicant, the above-mentioned characteristics (1) through (3) required for a dielectric porcelain composition may be basically satisfied. However, there is a problem that it is difficult to control the temperature coefficient τf in a predetermined range, in particular in a positive direction.

The invention intends to provide a dielectric porcelain composition for use in electronic devices, which has the dielectric characteristics such that the Qf value is high, the temperature coefficient τf of a resonant frequency is small and a value thereof can be controlled in a wide range in positive and negative directions in the vicinity where the relative dielectric constant ∈r is 39.

Means for Solving the Problem

The inventors have made intensive studies on a composition of La—Al—Sr—Ti-based oxide so as to obtain a dielectric porcelain composition having a constitution in which the temperature coefficient τf of a resonant frequency is small and a value thereof can be controlled in a wide range in positive and negative directions. As a result, the inventors have found that when, in La—Pr—Al—Ga—Sr—Ti-based oxide dielectric porcelain, contents of the respective elements are limited to be within particular ranges and Sr is partially substituted by Ca, a structure having a (1-x)($La_{1-y}Ln_y$)($Al_{1-z}Ga_z$)$O_3$-x($Sr_{1-m}Ca_m$)$TiO_3$ solid solution as a main phase, in which a solid solution of Al—Ga—Sr-based oxide and/or a solid solution of Al—Ga-based oxide and a Sr oxide is/are precipitated in a grain boundary thereof, can be obtained; and, in particular, in the vicinity where the relative dielectric constant ∈r is 39, it has high characteristics with the Qf value of 57,000 or more and the temperature coefficient τf of the resonant frequency can be controlled in the range of −8 to 6 ppm/° C., thereby completing the invention.

That is, the invention relates to:
a dielectric porcelain composition for use in electronic devices, comprising, as a main phase, a (1-x)($La_{1-y}Ln_y$)($Al_{1-z}Ga_z$)$O_3$-x($Sr_{1-m}Ca_m$)$TiO_3$ solid solution, wherein Ln represents one or both of Pr and Nd; and x, y, z, and m each satisfy the following values:

$0.5 \leq x \leq 0.6$, $0 < y \leq 0.2$, $0 < z \leq 0.05$, and $0 < m \leq 0.3$, and wherein, in a grain boundary thereof, a solid solution of Al—Ga—Sr-based oxide; a solid solution of Al—Ga-based oxide and an Sr oxide; or a solid solution of Al—Ga—Sr-based oxide as well as a solid solution of Al—Ga-based oxide and an Sr oxide is/are present.

Furthermore, the invention also relates to a dielectric porcelain composition for use in electronic devices, in which, in the constitution above, $\alpha$-$Al_2O_3$ is not substantially present in the grain boundary.

ADVANTAGE OF THE INVENTION

According to the invention, as a dielectric porcelain for use in electronic devices, the Qf value can be set at 57,000 or more and the temperature coefficient $\tau f$ of the resonant frequency can be controlled in the range of from −8 to 6 ppm/° C. in the vicinity where the relative dielectric constant $\in r$ is 39.

According to the invention, when, in La—Ln—Al—Ga—Sr—Ti-based oxide dielectric porcelain, Sr is partially substituted by Ca, the temperature coefficient $\tau f$ can be controlled and the reactivity at the time of calcination can be improved to thereby enable the calcination at a temperature in the range of from 1200 to 1300° C. at which conventional La—Al—Sr—Ti-based oxide dielectric porcelain is difficult to calcine.

BEST MODE FOR CARRYING OUT THE INVENTION

The dielectric porcelain composition according to the invention contains a $(1-x)(La_{1-y}Ln_y)(Al_{1-z}Ga_z)O_3$-$x(Sr_{1-m}Ca_m)TiO_3$ solid solution as a main phase and, in a grain boundary thereof, particular solid solution(s), namely, a solid solution of Al—Ga—Sr-based oxide and/or a solid solution of Al—Ga-based oxide and Sr oxide is/are present.

In the invention, reasons for limiting components, Ln, x, y, z and m of a $(1-x)(La_{1-y}Ln_y)(Al_{1-z}Ga_z)O_3$-$x(Sr_{1-m}Ca_m)TiO_3$ solid solution are as follows. In the beginning, Ln represents at least one kind or both of Pr and Nd. When Pr is used as the Ln, $\tau f$ can be shifted toward a positive direction and, when Nd is used as the Ln, $\tau f$ can be shifted toward a negative direction.

Herein, x represents a component range of $(La_{1-y}Ln_y)(Al_{1-z}Ga_z)O_3$ as expressed by (1-x) and a component range of $(Sr_{1-m}Ca_m)TiO_3$ as expressed by (x), and it is preferably in the range satisfying $0.5 \leq x \leq 0.6$. When it is less than 0.5, the relative dielectric constant $\in r$ unfavorably becomes smaller, while when it exceeds 0.6, the relative dielectric constant $\tau f$ unfavorably increases to lower the Qf value to be smaller than 57,000.

Then, y represents a component range of La and Ln, and is preferably $0<y \leq 0.2$. When y exceeds 0.2, unfavorably, the Qf value becomes smaller and $\tau f$ becomes larger.

In the next place, z represents a component range of Al and Ga, and is preferably $0<z \leq 0.05$. When z exceeds 0.05, the Qf value unfavorably becomes smaller. In particular, Ga in the invention is a very important element and, owing to the presence of Ga, the above-mentioned substitution effect of the Ln and a substitution effect of Ca mentioned below can be obtained. That is, even when Sr is partially added to Ca in a component system where Ga is not present, the Qf value remains low and $\tau f$ cannot be controlled.

Then, m represents a component range of Sr and Ca, and is preferably $0<m \leq 0.3$. When m exceeds 0.3, $\tau f$ unfavorably becomes too large. When Sr is partially substituted by Ca, the temperature coefficient $\tau f$ becomes controllable and the reactivity at the time of calcination can be improved to thereby enable the calcination at a temperature in the range of from 1200 to 1300° C. at which conventional La—Al—Sr—Ti-based oxide dielectric porcelain is difficult to calcine.

According to the invention, when the respective elements are limited to the foregoing component ranges, with a $(1-x)(La_{1-y}Ln_y)(Al_{1-z}Ga_z)O_3$-$x(Sr_{1-m}Ca_m)TiO_3$ solid solution as a main phase, in a grain boundary thereof, any one of (1) a solid solution of Al—Ga—Sr-based oxide, (2) a solid solution of Al—Ga-based oxide and a Sr oxide, and (3) a solid solution of Al—Ga—Sr-based oxide as well as a solid solution of Al—Ga-based oxide and a Sr oxide is/are precipitated and present.

Whether the grain boundary is present or not can be confirmed by means of an EPMA analysis of a sintered body of a dielectric porcelain composition. However, although it is possible to confirm that an entire Sr oxide is not contained in the main phase at all, whether it is present in a grain boundary as a solid solution of an Al—Ga—Sr-based oxide or as a solid solution of an Al—Ga-based oxide and a Sr oxide cannot be distinguished; accordingly, the above (1) through (3) are limited.

In the dielectric porcelain composition of the invention, as verified below by examples, it is obvious that at least Al forms a solid solution of oxide with Ga to be present in a grain boundary. Accordingly, in the porcelain composition, Al does not exist as $\alpha$-$Al_2O_3$, namely, in the constitution thereof, $\alpha$-$Al_2O_3$ is not substantially present.

The dielectric porcelain composition of the invention can be readily produced by obtaining a sintered body according to known methods in which the respective processes such as blending of raw material powders, wet or dry mixing, drying, calcination, wet or dry pulverization, drying, granulation, molding and sintering and the respective devices are appropriately selected.

EXAMPLES

Example 1

As starting raw materials, high-purity powders of $La_2O_3$, $Nd_2O_3$, $Pr_6O_{11}$, $Al_2O_3$, $Ga_2O_3$, $SrCO_3$, $CaCO_3$ and $TiO_2$ were prepared. The respective powders were blended as shown in Table 1, mixed in pure water followed by drying, whereby mixed powders having an average particle diameter in the range of from 0.7 to 1.4 μm were obtained.

In the next place, the mixed powders were calcined at a temperature in the range of from 1100 to 1300° C. for 2 to 6 hr in accordance with the compositions thereof. The calcined powders thus obtained were pulverized to 0.6 to 1.5 μm by means of wet pulverization, followed by drying. Furthermore, PVA was added to the dried powder, followed by mixing and subsequent granulating with a granulating device.

The granulated powder thus obtained was molded to a mold density of 2 to 4 g/cm³ with a uniaxial press machine. The green compact thus obtained was removed of a binder at a temperature in the range of from 300 to 700° C. and then sintered in an atmosphere having an oxygen concentration of from 50 to 100% at a temperature in the range of from 1500 to 1800° C. for 10 to 50 hr to thereby obtain a sintered body.

The sintered body thus obtained was processed into a size of ϕ10 mm×4 to 9 mm to obtain a test piece. The obtained test piece was measured of the relative dielectric constant, Qf value and $\tau f$ value by the use of a network analyzer in accordance with a H & C method. Measurement results are shown in Table 1.

Test piece Nos. 1 through 43 are examples according to the invention, and Nos. 44 through 56 are comparative examples. In the comparative examples, No. 44 is a case where x is same as that of example No. 1 and y(Ln), z(Ga) and m(Ca) are not contained; Nos. 45 through 49 are cases where, in the compositions of Nos. 1 through 5, z(Ga) is not contained; No. 50 is a case where, in the composition of example 1, m(Ca) is not contained; Nos. 51 and 52 are cases where, in the composition of No. 1, x is outside the range; No. 53 is a case where, in the composition of No. 1, y(Ln) is not contained and x is outside the range; No. 54 is a case where, in the composition of No. 1, y(Ln) is outside the range; No. 55 is a case where, in the composition of example 1, z(Ga) is outside the range; and No. 56 is a case where, in the composition of No. 1, m(Ca) is outside the range.

As obvious from Table 1, test pieces according to the invention have the Qf values in the range of from 57,000 to 88,000 and the $\tau f$ values in the range of from −8 to 6 ppm/° C. in the vicinity where the relative dielectric constant is 39. Accordingly, it is obvious that the $\tau f$ value can be controlled in the above-mentioned range by selecting the composition.

Example 2

An EPMA analysis result on the test piece No. 1 in example 1 is shown in FIG. 1 and schematic diagrams thereof are shown in FIGS. 2 through 6. In FIG. 1, an upper left portion shows BEI (compositional image, a schematic diagram is shown in FIG. 2); an upper center portion shows a characteristic X-ray image of Al (a schematic diagram is shown in FIG. 3); an upper right portion shows a characteristic X-ray image of Ga (a schematic diagram is shown in FIG. 4); a middle left portion shows a characteristic X-ray image of Ti (a schematic diagram is shown in FIG. 5); a middle center portion shows a characteristic X-ray image of La (a schematic diagram is shown in FIG. 6); a middle right portion shows a characteristic X-ray image of Sr; and a lower left portion shows a characteristic X-ray image of Ca, respectively.

In a compositional image at an upper left portion of FIG. 1, a portion seen white (in a schematic diagram of FIG. 2, a portion surrounded by a thin black line over an entire base portion) is a main phase, and a grey portion (in the schematic diagram, a portion surrounded by a heavy black line and a heavy black line) is a grain boundary. In characteristic X-ray images of Al and Ga, portions same as grain boundary portions (within line frames of schematic diagrams of FIGS. 3 and 4) in the compositional image are white. This shows that Al and Ga are present in grain boundaries. By contrast, in characteristic X-ray images of Ti and La, portions same as the grain boundaries (within line frames of schematic diagrams of FIGS. 5 and 6) in the compositional image are black. This shows that Ti and La are not present in the grain boundaries.

A characteristic X-ray image of Sr oxide in accordance with the EPMA does not clarify a chemical form present in the grain boundary. However, according to a quantitative composition analysis by means of the EPMA, it is confirmed that Sr is partially contained in the grain boundary.

Accordingly, it can be considered that in the grain boundary, Al, Ga and Sr are present in any one of forms of (1) a solid solution of Al—Ga—Sr-based oxide, (2) a solid solution of Al—Ga-based oxide and a Sr oxide and (3) a solid solution of Al—Ga—Sr-based oxide, a solid solution of Al—Ga-based oxide and a Sr oxide.

Example 3

Results of X-ray diffraction of the respective test pieces where a substitution amount of Ca is variously altered are shown in FIG. 7. In FIG. 7, an uppermost located X-ray diffraction pattern shows a case where m=0 (test piece No. 43); one below this shows a case where m=0.05 (test piece No. 1); one further below this shows a case where m=0.10 (test piece No. 2); one still further below this shows a case where m=0.20 (test piece No. 4); and an lowermost located one shows a case where m=0.30 (test piece No. 6), respectively. The respective test pieces were calcined at 1300° C. for 4 hr.

As obvious from FIG. 7, as goes from an upper pattern to a lower pattern, diffraction peaks become sharper. This shows that, as a substitution amount of Ca increases, the reactivity at the time of calcination is improved. That is, when Sr is partially substituted by Ca, the reactivity at the time of calcination can be improved to thereby enable the calcination at a temperature in the range of from 1200 to 1300° C. at which conventional La—Al—Sr—Ti-based oxide dielectric porcelain is difficult to calcine.

TABLE 1

| No. | X | y | z | m | Pr:Nd (molar ratio) | Relative dielectric constant | Qf value (GHz) | $\tau f$ (ppm/° C.) |
|---|---|---|---|---|---|---|---|---|
| 1 | 0.55 | 0.05 | 0.035 | 0.05 | 1:0 | 39.01 | 88589 | −2.91 |
| 2 | 0.55 | 0.05 | 0.035 | 0.10 | 1:0 | 39.10 | 79837 | −1.88 |
| 3 | 0.55 | 0.05 | 0.035 | 0.15 | 1:0 | 39.03 | 82889 | 0.19 |
| 4 | 0.55 | 0.05 | 0.035 | 0.20 | 1:0 | 39.03 | 75251 | 2.16 |
| 5 | 0.55 | 0.05 | 0.035 | 0.25 | 1:0 | 39.06 | 73719 | 3.07 |
| 6 | 0.55 | 0.05 | 0.035 | 0.30 | 1:0 | 39.08 | 73335 | 4.50 |
| 7 | 0.55 | 0.05 | 0.035 | 0.05 | 1:0 | 39.05 | 83318 | −3.23 |
| 8 | 0.55 | 0.05 | 0.035 | 0.10 | 1:0 | 39.08 | 82337 | −1.37 |
| 9 | 0.55 | 0.05 | 0.035 | 0.15 | 1:0 | 39.11 | 80694 | −0.38 |
| 10 | 0.55 | 0.05 | 0.035 | 0.20 | 1:0 | 39.13 | 78441 | 1.69 |
| 11 | 0.55 | 0.05 | 0.035 | 0.25 | 1:0 | 39.14 | 73559 | 4.66 |
| 12 | 0.55 | 0.05 | 0.035 | 0.30 | 1:0 | 39.18 | 71846 | 6.18 |
| 13 | 0.55 | 0.05 | 0.035 | 0.05 | 1:1 | 39.06 | 80224 | −6.92 |
| 14 | 0.55 | 0.05 | 0.035 | 0.10 | 1:1 | 39.08 | 79128 | −4.83 |
| 15 | 0.55 | 0.05 | 0.035 | 0.15 | 1:1 | 39.04 | 76448 | −2.22 |
| 16 | 0.55 | 0.05 | 0.035 | 0.20 | 1:1 | 39.06 | 73265 | 0.16 |
| 17 | 0.55 | 0.05 | 0.035 | 0.25 | 1:1 | 39.07 | 70129 | 1.74 |
| 18 | 0.55 | 0.05 | 0.035 | 0.30 | 1:1 | 39.02 | 69325 | 2.84 |
| 19 | 0.55 | 0.05 | 0.035 | 0.05 | 1:1 | 39.06 | 78626 | −5.33 |
| 20 | 0.55 | 0.05 | 0.035 | 0.10 | 1:1 | 39.09 | 76987 | −3.39 |

TABLE 1-continued

| No. | X | y | z | m | Pr:Nd (molar ratio) | Relative dielectric constant | Qf value (GHz) | τf (ppm/° C.) |
|---|---|---|---|---|---|---|---|---|
| 21 | 0.55 | 0.05 | 0.035 | 0.15 | 1:1 | 39.10 | 74998 | −1.78 |
| 22 | 0.55 | 0.05 | 0.035 | 0.20 | 1:1 | 39.11 | 74231 | 0.32 |
| 23 | 0.55 | 0.05 | 0.035 | 0.25 | 1:1 | 39.12 | 69899 | 1.88 |
| 24 | 0.55 | 0.05 | 0.035 | 0.30 | 1:1 | 39.14 | 69473 | 3.01 |
| 25 | 0.55 | 0.05 | 0.035 | 0.05 | 0:1 | 38.99 | 57221 | −8.22 |
| 26 | 0.55 | 0.05 | 0.035 | 0.10 | 0:1 | 38.98 | 59899 | −6.79 |
| 27 | 0.55 | 0.05 | 0.035 | 0.15 | 0:1 | 38.96 | 61448 | −4.66 |
| 28 | 0.55 | 0.05 | 0.035 | 0.20 | 0:1 | 38.97 | 59911 | −1.11 |
| 29 | 0.55 | 0.05 | 0.035 | 0.25 | 0:1 | 39.00 | 59837 | 0.54 |
| 30 | 0.55 | 0.05 | 0.035 | 0.30 | 0:1 | 39.01 | 60004 | 1.34 |
| 31 | 0.55 | 0.05 | 0.035 | 0.05 | 0:1 | 38.96 | 59874 | −8.33 |
| 32 | 0.55 | 0.05 | 0.035 | 0.10 | 0:1 | 38.95 | 60159 | −7.90 |
| 33 | 0.55 | 0.05 | 0.035 | 0.15 | 0:1 | 38.97 | 61005 | −3.74 |
| 34 | 0.55 | 0.05 | 0.035 | 0.20 | 0:1 | 38.94 | 60088 | −2.44 |
| 35 | 0.55 | 0.05 | 0.035 | 0.25 | 0:1 | 38.98 | 59899 | −1.08 |
| 36 | 0.55 | 0.05 | 0.035 | 0.30 | 0:1 | 38.98 | 59357 | 0.63 |
| 37 | 0.52 | 0.05 | 0.035 | 0.10 | 1:0 | 37.81 | 97623 | −10.00 |
| 38 | 0.58 | 0.05 | 0.035 | 0.10 | 1:0 | 40.54 | 84572 | 1.43 |
| 39 | 0.50 | 0.05 | 0.035 | 0.05 | 1:0 | 35.91 | 108799 | −21.40 |
| 40 | 0.60 | 0.05 | 0.035 | 0.05 | 1:0 | 42.29 | 59572 | 8.42 |
| 41 | 0.55 | 0.10 | 0.035 | 0.05 | 1:0 | 39.00 | 80101 | 2.99 |
| 42 | 0.55 | 0.20 | 0.035 | 0.05 | 1:0 | 38.25 | 72360 | 3.87 |
| 43 | 0.55 | 0.05 | 0.050 | 0.05 | 1:0 | 38.77 | 78621 | 1.29 |
| 44 | 0.55 | — | — | — | — | 38.11 | 66939 | −6.21 |
| 45 | 0.55 | 0.05 | — | 0.05 | 1:0 | 38.61 | 67789 | −4.13 |
| 46 | 0.55 | 0.05 | — | 0.10 | 1:0 | 38.62 | 67661 | −1.81 |
| 47 | 0.55 | 0.05 | — | 0.15 | 1:0 | 38.69 | 66525 | 1.97 |
| 48 | 0.55 | 0.05 | — | 0.20 | 1:0 | 38.60 | 66321 | 3.10 |
| 49 | 0.55 | 0.05 | — | 0.25 | 1:0 | 38.69 | 65994 | 4.06 |
| 50 | 0.55 | 0.05 | 0.035 | — | 1:0 | 39.02 | 61492 | −5.43 |
| 51 | 0.40 | 0.55 | 0.035 | 0.05 | 1:0 | 31.74 | 124364 | −36.80 |
| 52 | 0.70 | 0.55 | 0.035 | 0.05 | 1:0 | 52.11 | 30858 | 56.40 |
| 53 | 0.55 | — | 0.035 | 0.05 | 1:0 | 38.06 | 70519 | −6.01 |
| 54 | 0.55 | 0.30 | 0.035 | 0.05 | 1:0 | 38.34 | 58267 | 4.11 |
| 55 | 0.55 | 0.05 | 0.060 | 0.05 | 1:0 | 39.09 | 57881 | 2.95 |
| 56 | 0.55 | 0.05 | 0.035 | 0.35 | 1:0 | 39.13 | 70731 | 5.01 |

INDUSTRIAL APPLICABILITY

According to the invention, a dielectric porcelain composition for use in electronic devices, which has excellent dielectric characteristics such that the Qf value is 57,000 or more and the temperature coefficient τf of the resonant frequency can be controlled in the range of −8 to 6 ppm/° C. in the vicinity where the relative dielectric constant ∈r is 39, can be obtained, whereby miniaturization and high performance which has been recently demanded for portable terminal electronic devices can be coped with.

Figure 1:
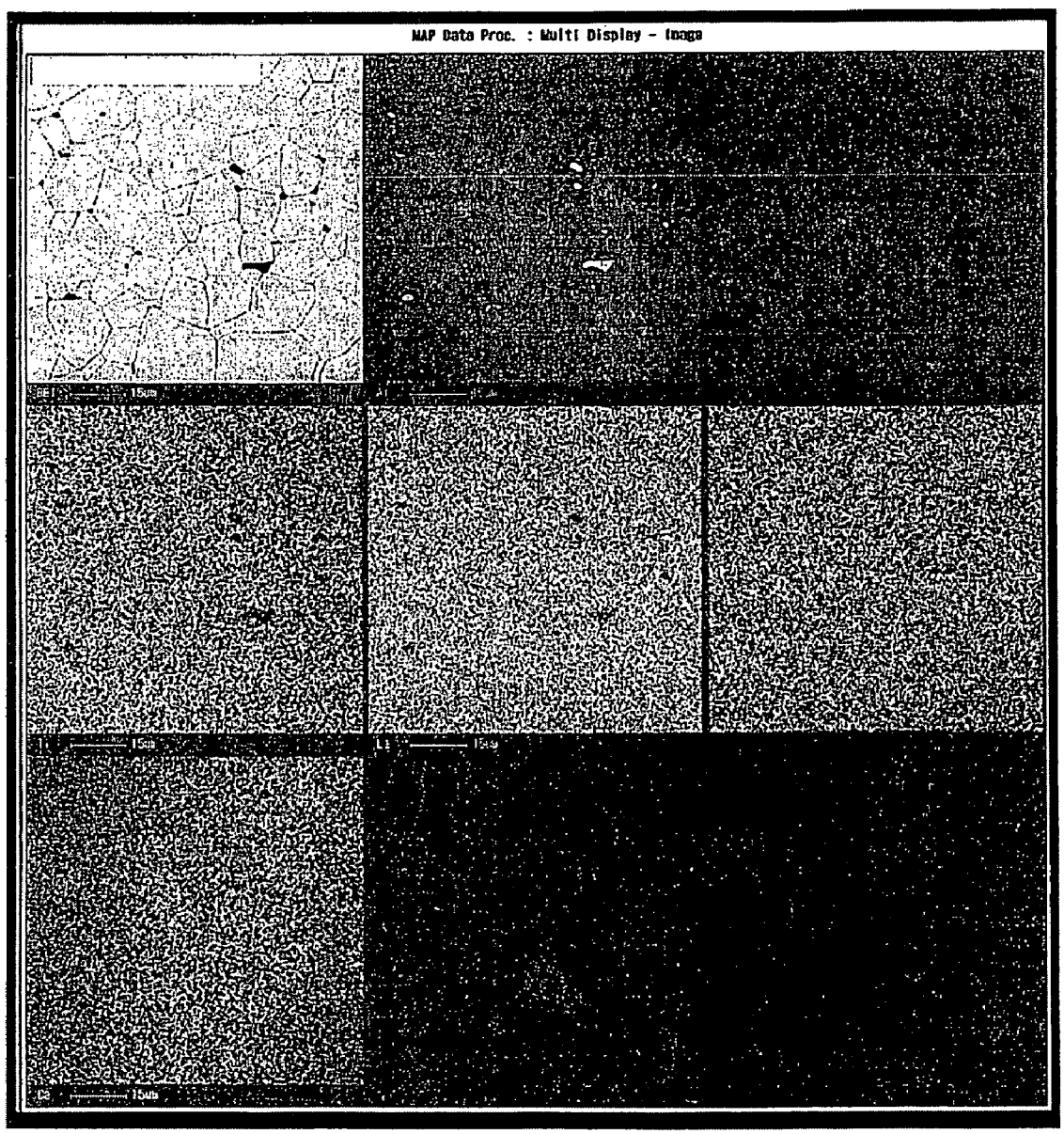
FIG. 1 is a diagram of compositional images and characteristic X-ray images showing EPMA analysis results of a dielectric porcelain composition of the invention for use in electronic devices.
Figure 2:
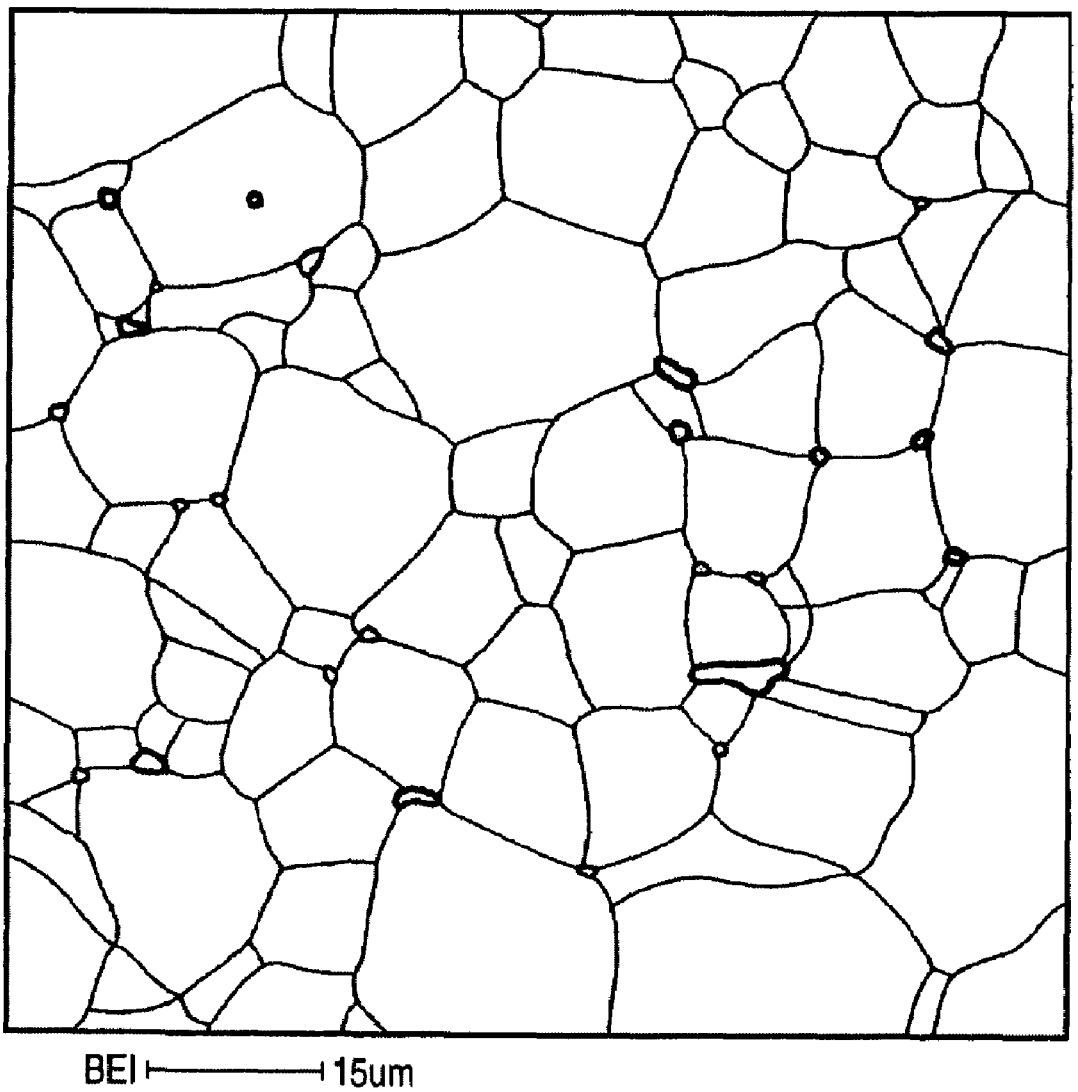
FIG. 2 is a schematic diagram showing BEI (compositional image) of FIG. 1.
Figure 3:
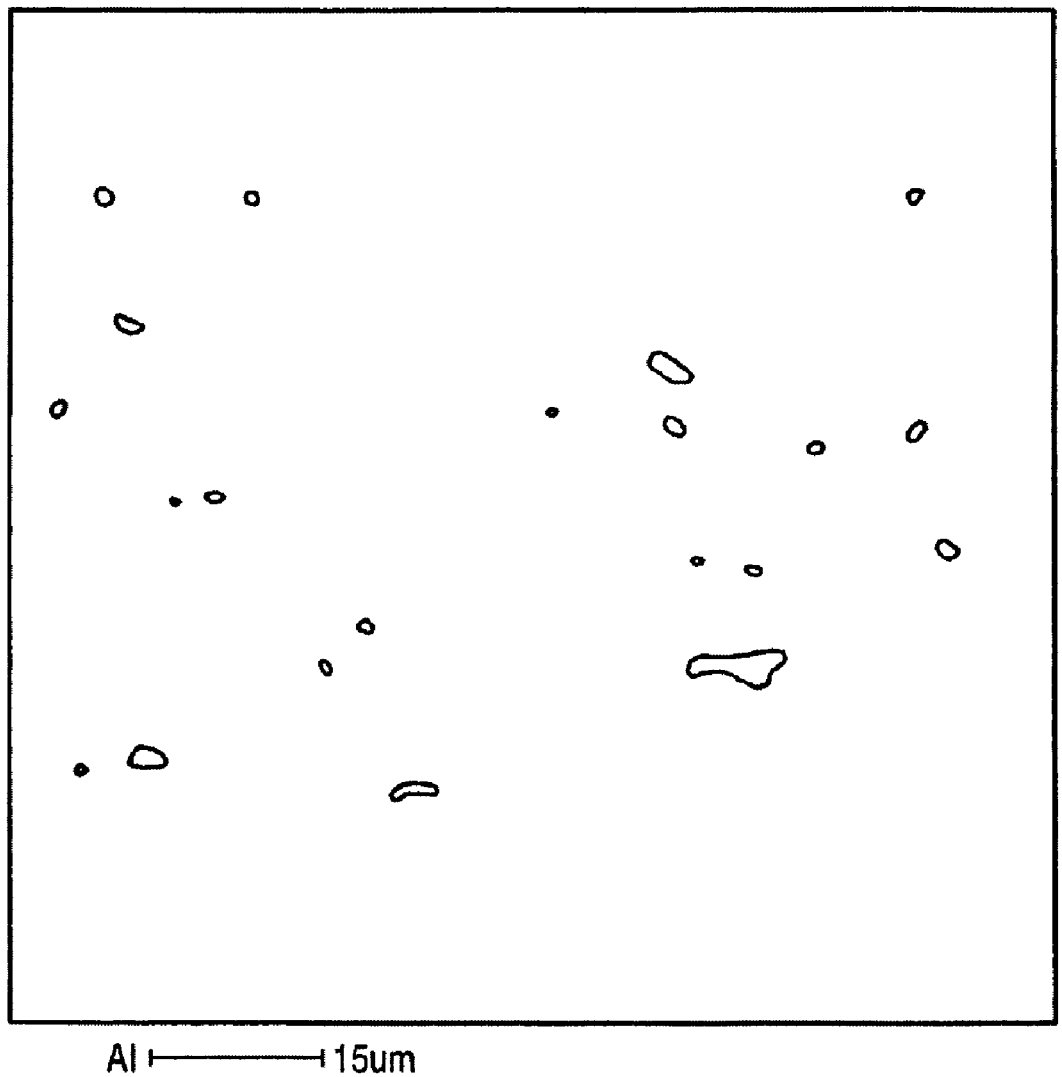
FIG. 3 is a schematic diagram showing a characteristic X-ray image of Al of FIG. 1.
Figure 4:
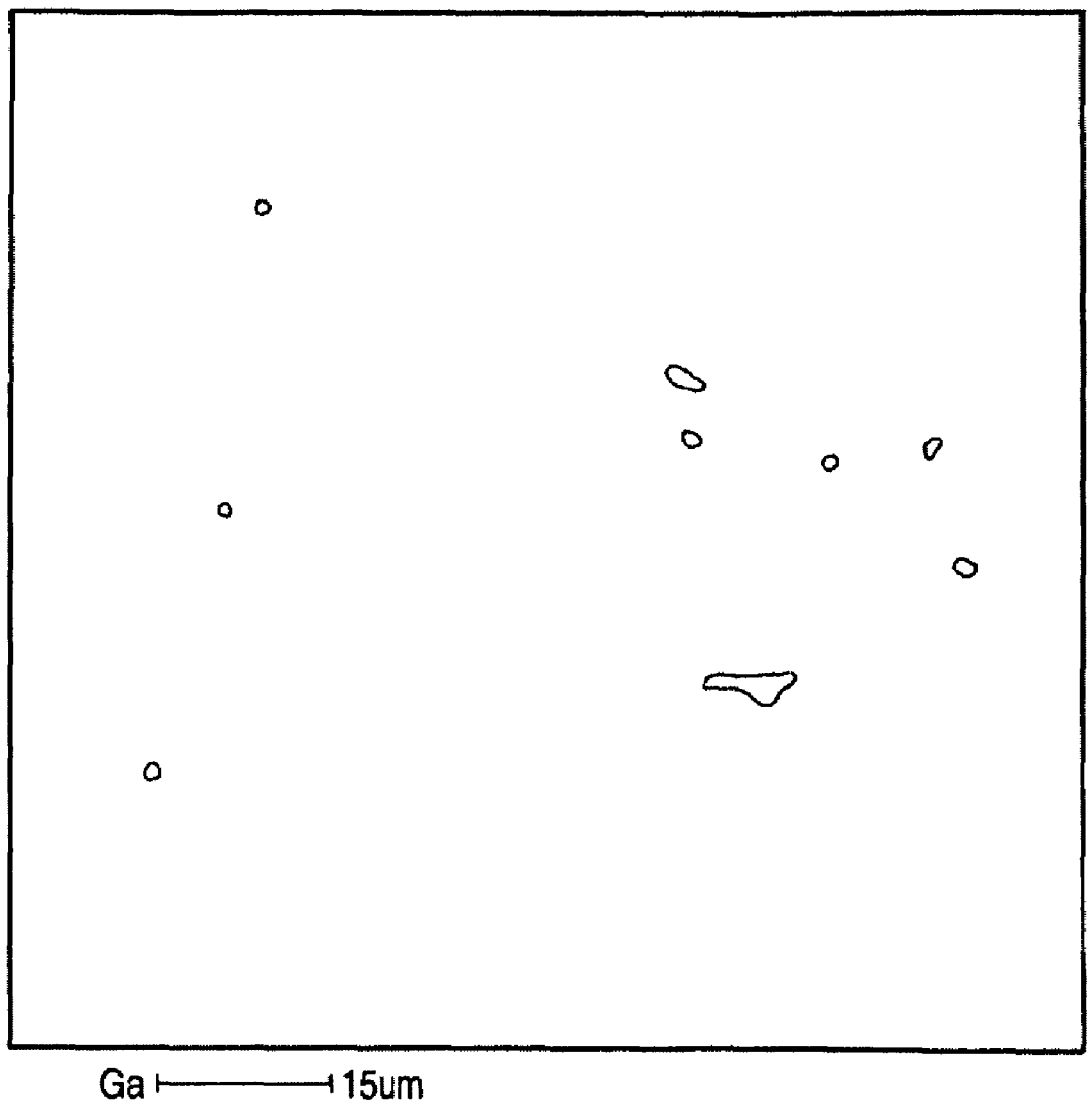
FIG. 4 is a schematic diagram showing a characteristic X-ray image of Ga of FIG. 1.
Figure 5:
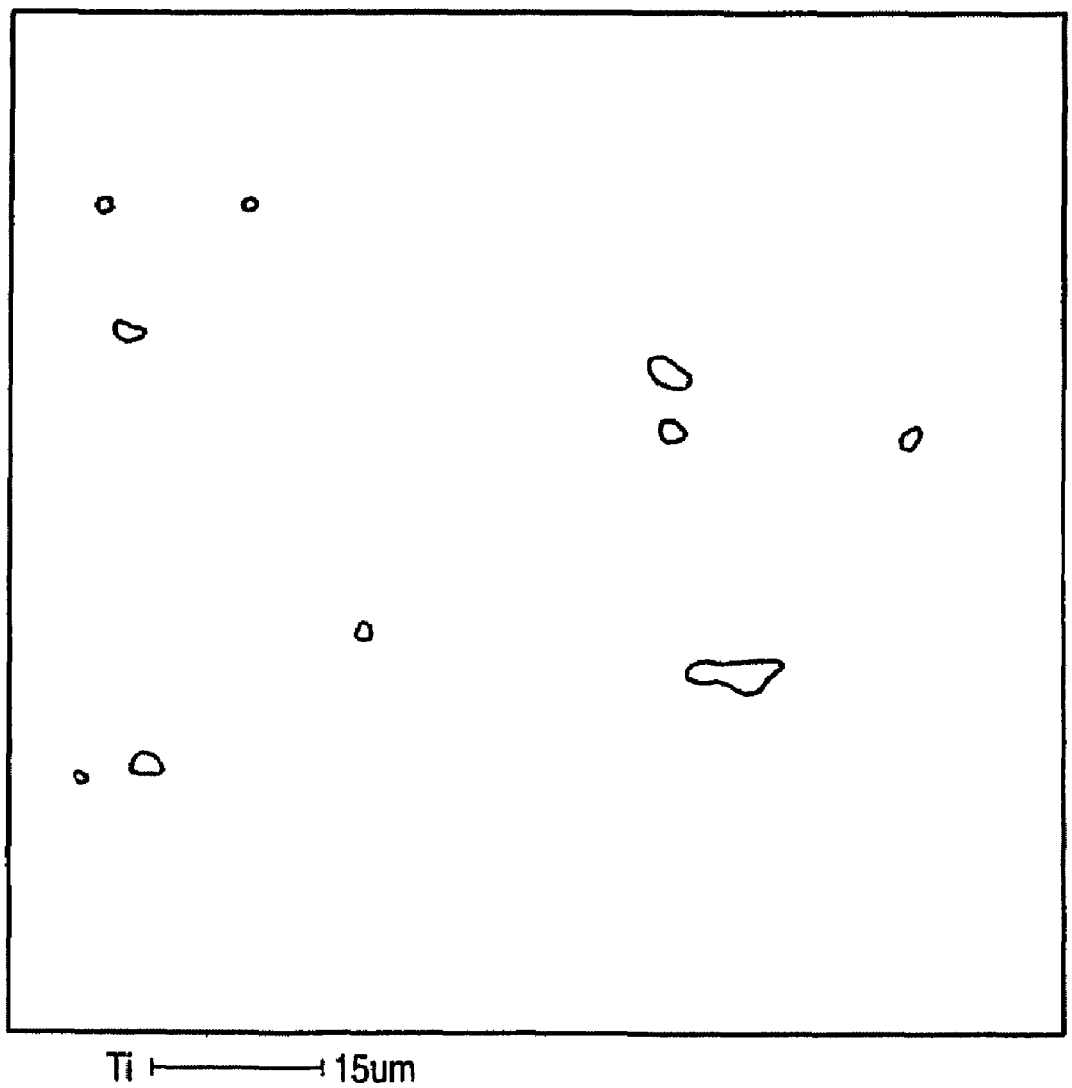
FIG. 5 is a schematic diagram showing a characteristic X-ray image of Ti of FIG. 1.
Figure 6:
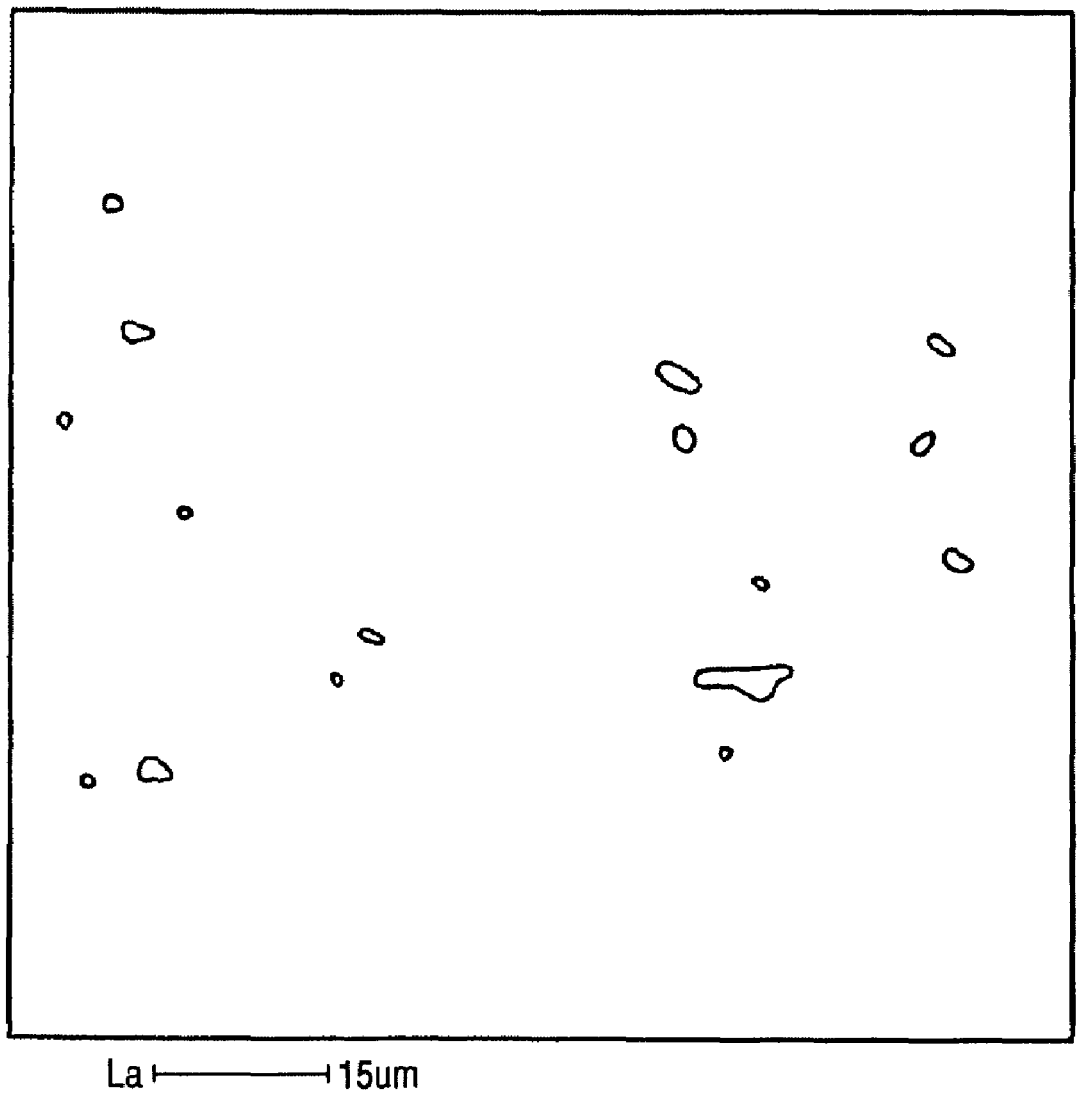
FIG. 6 is a schematic diagram showing a characteristic X-ray image of La of FIG. 1.
Figure 7:
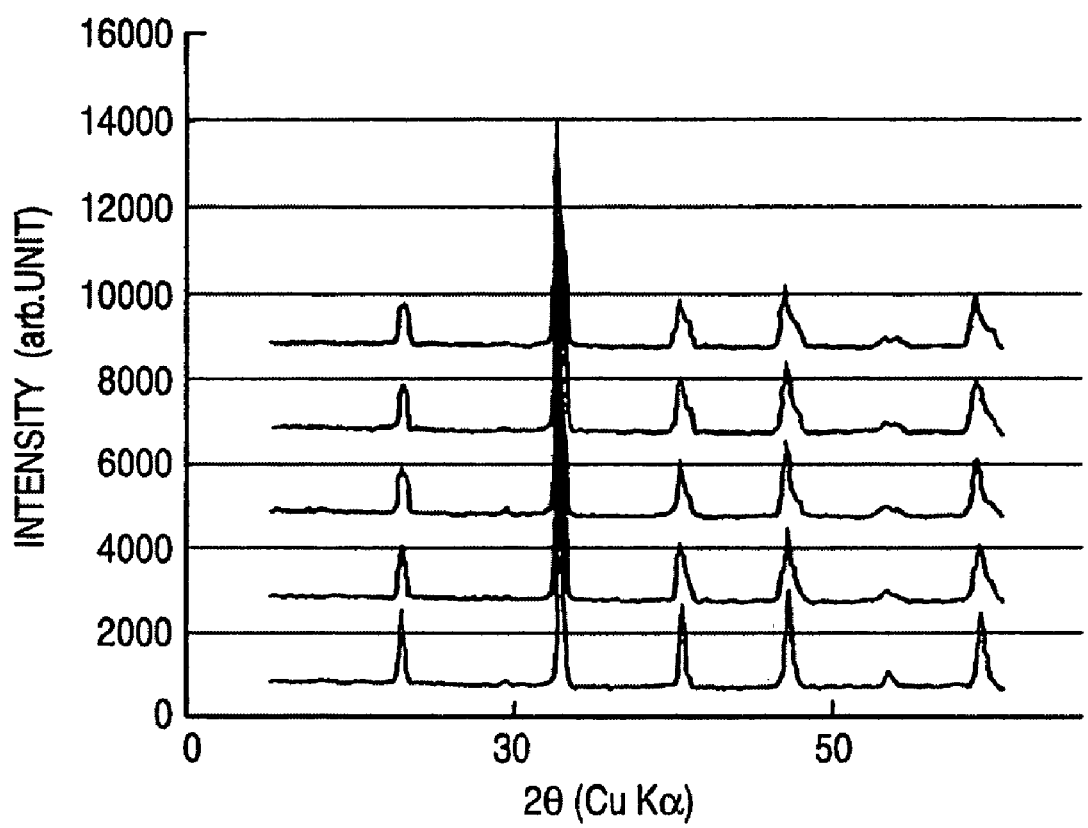
FIG. 7 is a graph showing X-ray diffraction results of dielectric porcelain composition of the invention for use in electronic devices.

The invention claimed is:

1. A dielectric porcelain composition for use in electronic devices, comprising, as a main phase, a $(1-x)(La_{1-y}Ln_y)(Al_{1-z}Ga_z)O_3$-$x(Sr_{1-m}Ca_m)TiO_3$ solid solution, wherein Ln represents one or both of Pr and Nd; and x, y, z, and m each satisfy the following values:

$0.5 \leq x \leq 0.6$, $0 < y \leq 0.2$, $0 < z \leq 0.05$, and $0 < m \leq 0.3$, and wherein, in a grain boundary thereof a solid solution of Al—Ga—Sr-based oxide; a solid solution of Al—Ga-based oxide and an Sr oxide; or a solid solution of Al—Ga—Sr-based oxide as well as a solid solution of Al—Ga-based oxide and an Sr oxide is/are present.

2. The dielectric porcelain composition for use in electronic devices according to claim 1, wherein $\alpha$-$Al_2O_3$ is not substantially present in the grain boundary.

* * * * *